(12) United States Patent
Haller (10) Patent No.: US 11,970,679 B2
(45) Date of Patent: Apr. 30, 2024

(54) SYSTEMS, APPARATUS, AND METHODS FOR SHORTENING AGING TIME AND ENHANCING FLAVOR OF DISTILLED OR FERMENTED BEVERAGES

(71) Applicant: James Haller, Austin, TX (US)

(72) Inventor: James Haller, Austin, TX (US)

( * ) Notice: Subject to any disclaimer, the term of this patent is extended or adjusted under 35 U.S.C. 154(b) by 434 days.

(21) Appl. No.: 17/094,605

(22) Filed: Nov. 10, 2020

(65) Prior Publication Data

US 2021/0179985 A1    Jun. 17, 2021

Related U.S. Application Data

(60) Provisional application No. 62/948,693, filed on Dec. 16, 2019.

(51) Int. Cl.
| | |
|---|---|
| *C12H 1/22* | (2006.01) |
| *C12G 1/00* | (2019.01) |
| *C12G 3/06* | (2006.01) |
| *C12H 1/16* | (2006.01) |
| *C12H 1/18* | (2006.01) |
| *C12H 6/02* | (2019.01) |

(52) U.S. Cl.
CPC ............... *C12H 1/22* (2013.01); *C12G 1/00* (2013.01); *C12G 3/06* (2013.01); *C12H 1/165* (2013.01); *C12H 1/18* (2013.01); *C12H 6/02* (2019.02)

(58) Field of Classification Search
None
See application file for complete search history.

(56) References Cited

U.S. PATENT DOCUMENTS 2,807,547 A     9/1957  Nickol
6,152,131 A *  11/2000  Heinonen ........... A61M 16/209
                                                        128/204.23
(Continued)

FOREIGN PATENT DOCUMENTS

ES    WO2017153618 A1    9/2017
WO    WO2018208946 A1   11/2018

OTHER PUBLICATIONS

Oliver Effron, This company says it can make top-shelf whiskey in just a few days, Oct. 8, 2018, CNN Business, US (found at https://www.cnn.com/2020/10/08/business/bespoken-whiskey-launch/index.html).

*Primary Examiner* — Elizabeth M Kerr
(74) *Attorney, Agent, or Firm* — The Law Office of Mason A. Gross, PLLC; Mason A. Gross (57) ABSTRACT

Time-reducing and flavor-enhancing techniques for alcoholic spirits may be provided as an alternative to conventional barrel-aging. Numerous controllable variables may be accessible for control at one process control panel or unit for a spirit-aging system. Variations in pressure, day/night cycle time, % $O_2$, ratio of exposed wood surface to gallons of spirit, variations in spirit liquid temperature, and the amount of rough and ultrasonic mixing variables may be made to decrease the aging time. The aging process may be monitored for the changing spirit characteristics by drawing periodic samples to compare to spirit-quality target goals. Combinations of the variables may be optimized for these goals. Changes also may be made to the variables to address issues arising for quality control. All or most of the vapor naturally emitted by the spirit may be avoided or captured in a container or vessel with no or substantially reduced volume loss.

38 Claims, 5 Drawing Sheets

(56) References Cited

U.S. PATENT DOCUMENTS

| | | |
|---|---|---|
| 6,869,630 B2 | 3/2005 | Gross |
| 2005/0123658 A1 | 6/2005 | Tyler |
| 2009/0068308 A1 | 3/2009 | Watson |
| 2010/0092636 A1 | 4/2010 | Watson |
| 2011/0070330 A1 | 3/2011 | Watson |
| 2011/0070331 A1* | 3/2011 | Watson .................. C12G 3/07 |
| | | 426/11 |
| 2012/0164300 A1* | 6/2012 | Niazi .................... C12H 1/063 |
| | | 99/277.2 |
| 2013/0149423 A1 | 6/2013 | Lix |
| 2014/0081580 A1* | 3/2014 | Kim ................... G01N 33/0004 |
| | | 702/24 |
| 2016/0289619 A1 | 10/2016 | Mancosky |
| 2017/0107467 A1 | 4/2017 | Bailey |
| 2017/0342359 A1* | 11/2017 | Jiricný .................. C12G 3/08 |
| 2017/0369831 A1 | 12/2017 | Dhesi |
| 2018/0305649 A1 | 10/2018 | Hall |
| 2018/0346855 A1 | 12/2018 | Davis |
| 2019/0169016 A1* | 6/2019 | Vandekerckhove ..... C12G 3/06 |
| 2021/0039010 A1* | 2/2021 | Boylan .................. C12H 1/08 |

* cited by examiner

SYSTEMS, APPARATUS, AND METHODS FOR SHORTENING AGING TIME AND ENHANCING FLAVOR OF DISTILLED OR FERMENTED BEVERAGES

CROSS-REFERENCE TO RELATED APPLICATIONS

This application claims the benefit of U.S. Provisional Application No. 62/948,693, filed Dec. 16, 2019.

FIELD OF THE INVENTION

The invention is generally related to distillation or fermentation of beverages, and more particularly, to shortening the aging time in the production of spirits or wine.

BACKGROUND

For a very long time, the production of distilled spirits or beverages (i.e, fermented, then distilled liquor or "hard" liquor) and fermented beverages (i.e., only fermented) having desirable characteristics for alcohol content, flavor, aroma, and color has been achieved via storage and natural aging over many years in wooden barrels, such as oak barrels. The terms "aging" or "aged," as used herein, is to be understood to mean a process of transforming the sensory (e.g., taste or flavor, aroma, and/or color) characteristics of an immature product to become a palatable and pleasant distilled or fermented alcoholic beverage. Many factors or processes may influence the natural and conventional aging of spirits, such as:

1. Contact of unmatured spirit with the raw surface of charred oak, which may be represented as a ratio of the wood surface area per gallon of spirit (~46 in$^2$/gal in a typical 53-gallon barrel).

2. Variations in the type of oak used for the barrel (e.g., American White Oak, French Oak, Eastern Europe Oak, or the like).

3. Variations in the amount of charring on the inside of the barrel (i.e., light, medium, heavy).

4. Variations in the amount of toasting of the wood barrel, which occurs during the charring process, as heat converts hemicellulose into sugar, creating a toasted layer below the charred (or "char") level; variations in toasting time, temperature, and char level create different flavor profiles.

5. Over time, oxygen ($O_2$), which comprises approximately 21% of the air at sea level, converts the mixture of unmatured spirit and complex compounds naturally found within the barrel wood, through oxidation processes, into products that exhibit flavors, aromas, and/or colors desired in the final spirit product.

6. Daily natural temperature fluctuations within environmentally uncontrolled barrel aging warehouses typically may be approximately 30° F.

7. Daily cyclic pressure changes within the "headspace" in the barrels stored in the warehouses typically may be approximately ±3 PSI.

Although many fine distilled spirits have been and continue to be produced by natural aging processes, their production typically involves industry constraints, such as:

1. Spirit product is locked into barrels for 4 to 18 years before the natural aging processes are completed, only then allowing for the sale of the contents for a profit.

2. Oak barrels are often very costly, only being usable for 2 to 3 cycles of spirit aging before needing to be discarded or sold.

3. High cost of building and maintaining large-scale warehousing for long-term storage of aging barrels significantly increases the amount of capital tied up during the extended aging periods before a profit may be realized.

4. Barrel spirit volume loss ("Angel's Share") typically may be 4-6%/year due to the natural "breathing" of the barrels, which equates to a major loss of spirit product during extended barrel aging periods.

5. Feedback on the success or failure of the spirit product may take most of the full aging time in the barrels.

6. Feedback on any experimentation or new product development may take many valuable years during the aging process.

7. Long term exposure to potential catastrophic loss of spirit product due to natural disasters, theft, accident, etc.

8. Lack of flexibility to make changes/corrections to the processes involved during manufacturing or long-term aging of the spirit product.

9. The aging process relies on the natural breathing of the barrel to replenish the internal $O_2$ level required for oxidation of the contents. This breathing process is not controlled and is a function of local weather and other environmental conditions.

To address some of the issues identified above, the techniques disclosed herein may be used as possible alternatives to barrel-aging that reduce the time needed to mature beverages via distillation or fermentation and for enhancing their flavors and other characteristics.

SUMMARY

In accordance with embodiments of the invention, systems, apparatus, processes, and methods are provided that advantageously may reduce the length of time required to mature and flavor spirits. The controlled and configurable temperature and pressure fluctuations within a spirit aging container propagate chemical and sensory changes in the liquid that may be designed to mimic the characteristic flavor, aroma and color of a conventionally aged product. A controlled fluctuation, sequence, or cycle of pressure temperature, vibrations, and/or a combination thereof, may be maintained, and flavorants added, for the duration of an aging process, or may be altered at any time during the process, to help the sensory characteristics of the spirit to mimic, achieve, or conform to the desired or desirable characteristics of a conventionally aged spirit. In some embodiments, these changes may be accomplished within a matter of weeks instead of years.

These systems, apparatus, processes, and methods may provide for:

1. Eliminating undesirable components within the spirit that may be detrimental to the spirit flavor.

2. Converting complex chemicals within the spirit and added flavorants to more desirable components that positively impact the spirit flavor.

3. Developing a desirable aroma in the spirit that mirrors that of conventionally aged products.

4. Changing the spirit color to match that of conventionally aged products.

In accordance with embodiments of the invention, the above activities may take place in a much shorter timeframe compared to conventional approaches, thus allowing for a faster return on investment without compromising the quality of the spirit product. Also, cost savings may be realized by eliminating the need to purchase expensive barrels and reducing the requirement for costly warehousing capacity with all the associated building, maintenance, and labor costs because of a reduction from years to weeks in aging time within such facilities, and thus the turnover or output of spirit product may be greatly increased.

In accordance with embodiments of the invention, advantages may be provided by the ability to control all or many aspects of the aging process continuously throughout the maturation cycle, such as time, temperature, pressure and ultrasonic vibration cycles, the quantity and mixture of added flavorants, the percentage of oxygen in an aging tank headspace, or the like ("controllable elements"). Samples of the spirit may be taken periodically and evaluated for their taste, color, and aroma in comparison to a quality target. Adjustments may then be made to any, some, or all of these controllable elements, as needed or desired, to direct or redirect the spirit quality to or toward the target.

In accordance with embodiments of the invention, systems, apparatus, processes, and methods are provided that may be scaled to match the needs of a small-scale home distiller, a startup distillation facility, or a major established distillation entity. For example, scaling may be from a 5-gallon batch to large scale barrel warehousing, perhaps only limited by the size of aging containers or vessels (e.g., stainless-steel vessels), compressible gas containers (e.g., bladder tanks or pneumatic cylinders), air cylinders, air compressor capacity, and $O_2$ storage vessel capacity employed in these embodiments.

Moreover, in accordance with embodiments of the invention, systems, apparatus, processes, and methods are provided that may be applicable also to the wine industry.

In accordance with embodiments of the invention, numerous variables may be accessible and controlled at one centrally located process control panel or unit for a spirit-aging system. In certain embodiments, all system components except for the air compressor (e.g., a pressure control gas source), oxygen cylinder with a regulator (e.g., a process control gas source), compressible gas container (e.g., a bladder tank or pneumatic cylinder) and aging container or vessel may be contained within the process control panel or unit. Variations in pressure, day/night cycle time, % $O_2$, the ratio of exposed wood surface to gallons of spirit, variations to spirit liquid temperature, and the amount of rough and ultrasonic mixing variables may be made to decrease the aging time. The aging process may be monitored for the changing spirit characteristics by drawing periodic samples to compare to spirit-quality target goals. Combinations of the variables may be optimized for these goals. Changes also may be made to the variables to address issues arising for quality control. All or most of the vapor naturally emitted by the spirit (in some sense like the "Angel's Share" loss in conventional barrel-aging) may be avoided or captured in a container or vessel with no or substantially reduced volume loss.

DETAILED DESCRIPTION

This application claims the benefit of U.S. Provisional Application No. 62/948,693, filed Dec. 16, 2019, which is incorporated herein in its entirety for all purposes.

As used herein, the term "fluidly coupled" means that components are coupled directly or indirectly together such that a gas or liquid may flow between them (in one or both directions) in a fluid-like manner with the couplings between the components provided by tubing, fittings, or the like, such as those made of copper, brass, stainless steel, PTFE Teflon®. Other materials may be used, as would be understood by one of ordinary skill in the art. Also, as used herein, the term "thermally coupled" means that components are coupled together directly or indirectly (or are in close enough proximity to each other) such that heat or heat energy may flow or be transferred or conducted between them.

In accordance with embodiments of the invention, a dramatic reduction in the aging time of a distilled spirit (or wine) from years to weeks or days may be provided while also achieving a desired or improvement of the flavor, aroma, and/or color of a traditionally aged spirit product, and therefore also possibly improve the overall invested capital resource turnaround.

These embodiments may provide, for example, robust control over the duration and characteristics of the "daily" cycle by artificially modifying the typical 24-hour day cycle to anywhere from minutes to weeks. Likewise, the environment the spirit is exposed to, such as, temperature, pressure, $O_2$ level, quantity and type of flavorants, or the like may be adjusted artificially to speed up the aging process. These embodiments may advantageously provide for:

1. Robust control of the pressure within the spirit liquid from 0 PSI to 40 PSI (or higher) inclusive over atmospheric pressure. Higher pressure drives the spirit liquid being aged or matured deeper into the wood grain, to greatly increase its exposure to complex chemicals that form the intricate and desired complexities of flavor, aroma, and color. An operating pressure of just 30 PSI above atmospheric pressure equates to an increase by a factor of 10× over natural storage warehouse barrel pressure fluctuations. As should be understood herein, unless otherwise indicated, references to pressure or PSI mean to pressures or PSI above or with respect to atmospheric pressure.

2. Robust control over the amount of $O_2$ absorbed within the volume of the spirit liquid. A higher amount of $O_2$ absorbed increases the rate of oxidation within the cellular body of the wood, which affects the flavor, aroma, and color profiles of the spirit liquid. Such control may provide an internal aging or maturing environment of up to 100% $O_2$, which equates to a 5× increase over ambient air $O_2$ levels.

3. Robust control to shorten the duration of the "daily" cycle, which greatly increases the "push-pull" of the alcohol into and out of the wood grain, increasing the "washing" effect of the alcohol with the complex compounds produced within the natural wood fibers that are the major contributors to the spirit flavor, aroma, and color. Assuming a one-hour cycle, for example, this enhances the "daily" cycle by 24×.

4. Robust control of the ratio of wood or other additives' surface areas to the volume of spirit liquid ($in^2$/gal). This may be accomplished by adding varying amounts of flavorants (e.g., wood chips/cubes, herbs, spices, etc.) into the aging or maturing vessel or container. For example, with a large possible total surface area provided by wood chips/cubes, this ratio may easily be increased by a factor of 10×.

5. Avoiding the need to purchase expensive wood (e.g., oak) barrels, as the cost of wood chips/cubes is very low by comparison.

6. Rough mixing of the spirit liquid and the flavorants within the aging or maturing vessel with each repeat of the "daily" pressure cycle because pressurized $O_2$ bubbles out of a diffuser stone into the spirit liquid.

7. Fine, in-depth, mixing within the aging or maturing vessel because of the ultrasonic vibrations created by an attached speaker. These vibrations may reach the cellular level of the interfaces between the wood, other added flavorants, and the spirit liquid, providing a deeper level of mixing and accelerating the natural chemical reactions occurring in the wood.

8. Feedback controlled, cyclic heating of the spirit within the aging container from ambient temperature to upwards of 130° F. safely by means of an external resistance heater wrapped around the aging container, an electric heating source immersed into the liquid or any other means of raising the liquid temperature in the aging container.

9. Periodic sampling of the aging container contents at a tapping port attached to the aging container. This enables periodic monitoring of changes to the spirit product over time.

10. Scaling of the disclosed system from, for example, a 5-gallon container to a 1000-gallon container or larger. Likewise, the disclosed system may be manifolded to extend to multi-tank systems, perhaps limited only by the size and number of stainless-steel aging containers, bladder tanks, air cylinders, compressor size, makeup $O_2$ supply, etc. used.

11. The fluid coupling between the aging container, the process control gas side of the compressible gas container, the vapor condenser and the process control gas source constitutes an airtight, enclosed system. Therefore, all the alcohol vapor generated within this system may be contained with little to no loss of volume. If there is loss of spirit volume, it may be from periodic intentional drawing of product samples for quality control evaluation, minor (<0.5% by volume) absorption of spirit into the added flavorants and any unexpected and controllable gas leakage from the airtight enclosure. During an "exhaling" phase of the aging cycle, as described further herein, the headspace gas (i.e., oxygen and spirit vapors possibly entrained in the oxygen) at the top of the aging container will pass through an adjustable orifice as it enters the vapor condenser on its way eventually back to the compressible gas container. This expanding gas will naturally cool as it drops in pressure. On the other side of the heat exchanger, the compressed air leaving the compressible gas container will likewise pass through another adjustable orifice before entering the vapor condenser enclosure on its way to ultimately venting to atmosphere. As this compressed air expands and drops in pressure, it will also drop in temperature. This dual action cooling effect will produce an overall chilled environment within the vapor condenser, causing the spirit vapor to condense and collect in a drop tube (not shown) at the base of the vapor condenser. This condensed vapor then may be periodically drained into a waste vessel for later qualitative or quantitative testing and/or disposal. Therefore, there is no or a much-reduced spirit loss per unit of aging time compared to the Angel's Share loss due to barrel breathing in conventional barrel aging (which typically is 4-6% per year, compounded annually), and thus equates to a major production savings.

12. Successfully combining, in the disclosed system, multiple aging time reduction and flavor enhancement techniques into one system under, for example, one freestanding process control panel or unit. The operator or distiller may monitor, from the process control panel or unit, all or most of the process variables and adjust them as needed or desired to optimize the progression of the aging process.

13. Determining settings of the disclosed system needed or desired to optimize the aging and/or flavor formation by designing tests and changing one or more of the above variables to exploit the processes involved.

For example, the following may be done:

i. Change the composition and quantity of the wood chips/cubes and/or other flavorants to fine tune the flavor, color, or taste.

ii. Tweak (e.g., vary or change) the day-night ("daily") cycle time to optimize the saturation rate of the liquid into and out of the wood grain.

iii. Tweak the pressure fluctuations used to optimize the saturation rate of the spirit liquid into and out of the wood grain.

iv. Tweak the percentage of $O_2$ used to improve the rate and quality of oxidation of the complex wood compounds in the wood and present in the aging liquid or spirit.

v. Tweak the temperature level and/or the duration cycle.

vi. Tweak the amplitude and/or the duration of the ultrasonic mixing.

Thus, the operator or distiller may easily run an array of controlled experiments, varying one controllable variable at a time while monitoring the quality through periodic sampling. In this way, the operator or distiller may be able to optimize the combination of process variables that minimizes the aging time while maximizing the quality of the spirit product (i.e., they may define the quality targets). For example, temperature and/or gas pressure values within the aging container may be controlled in a sinusoidal, stepped, sequential, or other manner, and this pattern, manner, fashion, fluctuation, or variation may be maintained during the duration of the aging process or may be altered at any time during the process to help alter the sensory characteristics to conform to or approach targeted values.

Figure 1:
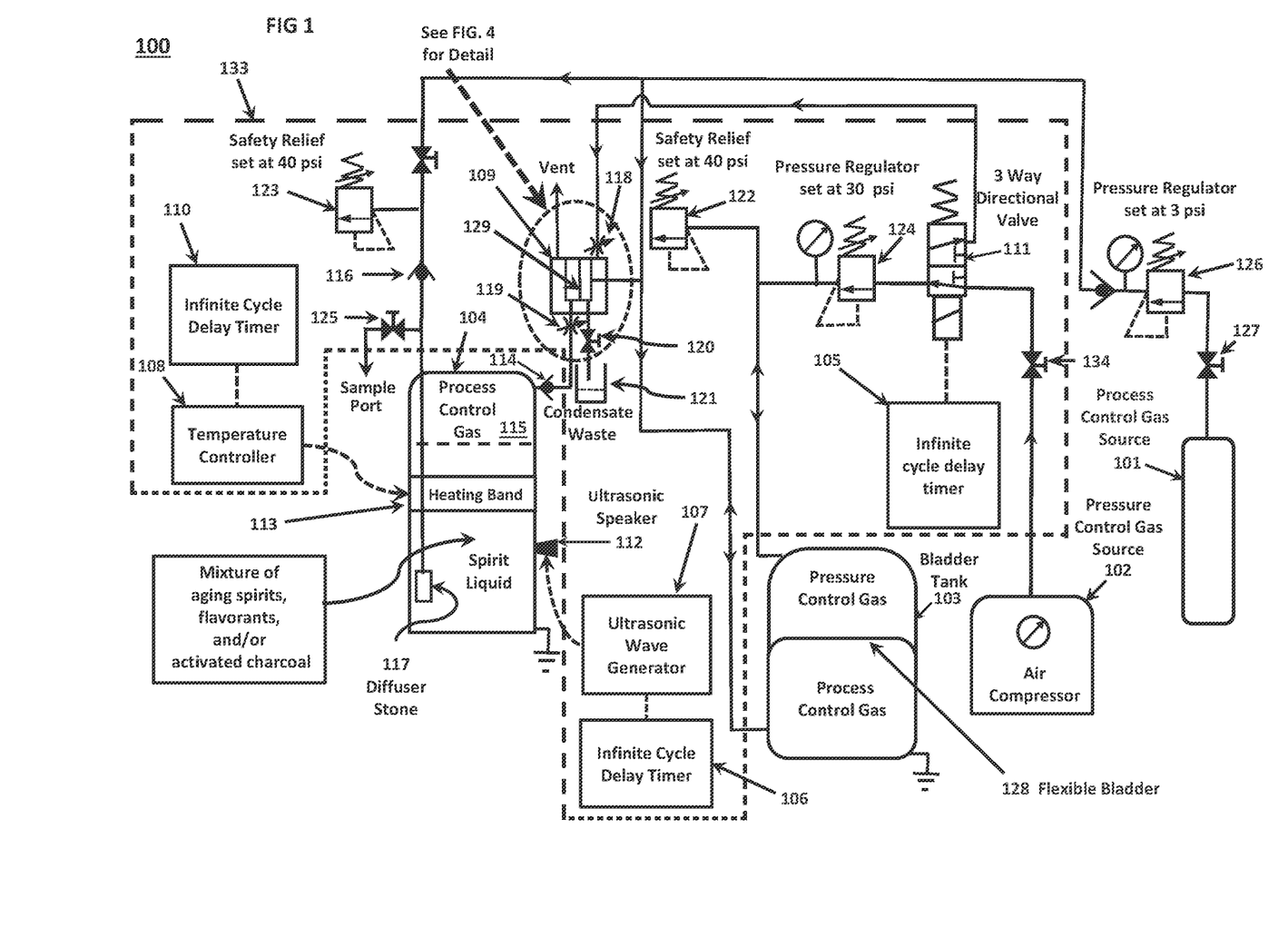
FIG. 1 is a block diagram of a spirit-aging system, in accordance with embodiments of the invention.

In accordance with embodiments of the invention, the disclosed system may provide three parallel process or method paths operating simultaneously (or almost simultaneously) on the same spirit product (see the flowchart in FIGS. 3a and 3b described further below). A process preparation and the three process or method paths are described below:

System and Process Preparation:

FIG. 1 shows a system 100 in accordance with embodiments of the invention. The system 100 in FIG. 1 includes a stainless-steel aging container, vessel, or tank 104, a pressure control gas source 102 (such as an air compressor), and a process control gas source 101, such as an oxygen tank, container, or cylinder. The system 100 may also include a compressible gas container 103 fluidly connected or coupled directly or indirectly within or to the system 100 for containing both the pressure control gas (e.g., air) and the process control gas (e.g., oxygen for distilled spirits or an inert gas as described herein for wine) while maintaining a separation between the two gases. The pressure control gas in the compressible gas container 103 may be used to pressurize the aging container 104 with the process control gas by driving the process control gas from the compressible gas container 103 into the aging container 104, as will be described further below. The compressible gas container may be a bladder tank, container, or vessel, as shown in FIG. 1. The compressible gas container 103 may be fluidly coupled to the pressure control gas source 102 on pressure control gas side (i.e., on the pressure control gas source 102 side of the compressible gas container 103). Also, the compressible gas container 103 may be fluidly coupled in parallel to the aging container 104 and to the process control gas source 101 on a process control gas side (i.e., on the aging container 104 side of the compressible gas container 103). A heat exchanger (made up of a vapor condenser 129 within a vapor condenser enclosure 109) may be fluidly coupled to the aging container 104, the pressure control gas source 102, the process control gas source 101 and the compressible gas container 103. Other components, such as variable cycle power delay timers, pressure regulators, safety pressure relief valves, electrically operated gas directional valves, gas pressure gauges, an ultrasonic wave generator, and manually operated function control switches, described further below, also may be included and connected or coupled (or fluidly coupled) directly or indirectly within or to the system 100.

Figure 2:
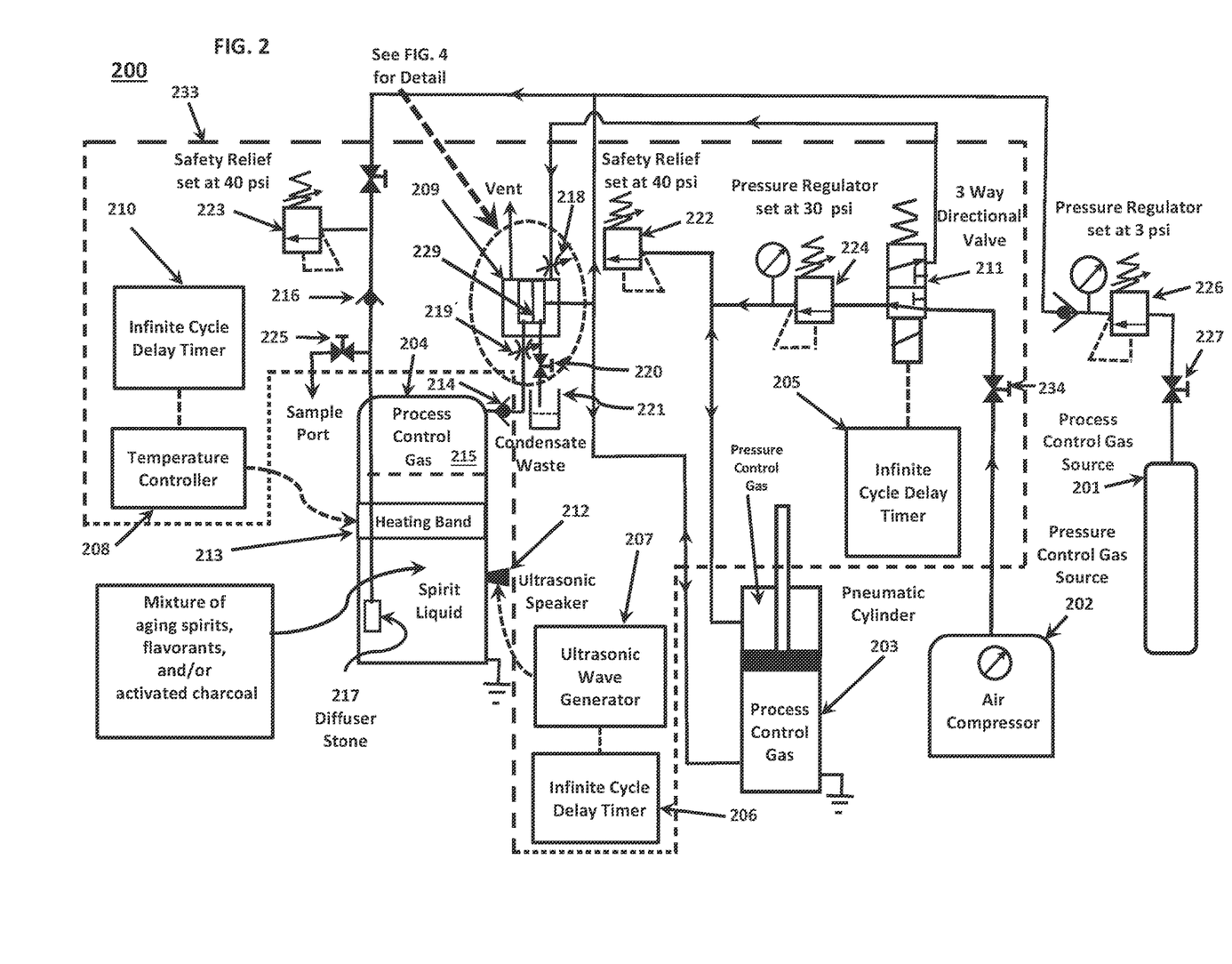
FIG. 2 is another block diagram of a spirit-aging system, in accordance with embodiments of the invention.

As described above, the system 100 may use a bladder tank as the compressible gas container 103 to maintain separation between the compressed pressure control gas and the process control gas used to pressurize the aging container 104. It is contemplated that any other type of system, apparatus, processes, or methods that accomplish or maintain the physical separation between the pressure control gas and the process control gas and used to pressurize the aging container 104, as would be understood by one of ordinary skill in the art, are to be included within the scope of the invention. This may involve, but is not limited to, a mechanically driven separation barrier between the pressure control gas and the process control gas. For example, as shown in FIG. 2, in a system 200 like the system 100, it is contemplated that a compressible gas container 203 instead may be a pneumatic (or air) cylinder used for the same purpose, in accordance with embodiments of the invention. All other components of the system 200 may be the same or equivalent to, and may operate the same as or similarly to, those of the system 100, although in FIG. 2 they are labeled by corresponding reference numerals in the 200s range.

The system 100 (or 200) generally uses copper, brass, stainless steel and/or PTFE Teflon tubing and fittings between its components, although other materials may be used for such tubing and fittings as long as they are chemically compatible with the liquid and vapor contents of the aging container. A separator (e.g., a bladder), which will be described below, for the compressible gas container 103, as a bladder tank embodiment, may be made of polypropylene with good alcohol chemical resistance, because certain plastics or PVC might deteriorate over time from the expected alcohol vapor exposure. Before the aging process begins, unmatured distilled spirit (or fermented wine) beverage may be placed into the aging container 104. This would generally, but not necessarily, be done immediately after the initial distillation (or after fermentation of the wine) process (not described herein) is or was already completed and without any subsequent conventional aging having been initiated. A mixture of desired flavorant additives may then be added to the aging container 104 before it is tightly closed and sealed. These additives may include, but are not limited to, toasted wood chips/cubes, charred wood chips/cubes, used wine barrel chips/cubes, used whiskey barrel chips/cubes, activated charcoal, herbs, fruit, spices, or the like. A grounding wire (not shown) may be attached to the aging container 104 and the compressible gas container 103 to prevent any static sparking or discharge, as a precaution to reduce the risk of fire involving a flammable spirit liquid. The system 100 may then be connected to an electrical power supply (not shown) through a main power switch (not shown).

An infinite cycle delay timer (ICDT) 105, which may be a variable cycle power delay timer (as may be other ICDTs discussed herein), may also be included in the system 100, which may be adjusted to set time-on and time-off duration times by turning, for example, control screws (not shown) on the face of the ICDT 105. These duration times may be adjusted anywhere between, for example, one second and one month. Other components also may be included in the system 100. Moreover, some or all of the components and fluid couplings of the system 100 may be arranged or co-located for ease of, or easy access for, control. For example, many of the components and their fluid, electrical, and/or electronic couplings to each other or within the system 100, as needed, may be arranged or co-located within a process control panel or unit 133, as shown in FIG. 1. The process control panel or unit 133 may advantageously offer ease of access or close proximity between components and their couplings to the operator, user, or distiller, or to an automated system to control the pressure, temperature, and vibration cycles (described below) of the system 100. Thus, at the control panel or unit 133, the operator, user, or distiller, or the automated system may control the overall system 100 process variables by control of components, such as variable cycle power delay timers, pressure regulators, safety pressure relief valves, electrically operated gas directional valves, gas pressure gauges, an ultrasonic wave generator, and manually operated or automated system actuated function control switches described herein. The process control panel or unit 133 may have co-located manually adjustable or automated system-actuated controls necessary to set, change, control, and monitor all the system variables. The automated system-controlled embodiments may be automated to run all or many of the processes described herein. For example, some automated system-controlled embodiments may have computer control via a process computer, smart device, such as a smart phone, tablet, or the like, processor, and/or PLC controller(s) (and the associated volatile or non-volatile memory, software or code), and Input/Output (I/O) for address, data, and control signals) necessary for performing the same functions for the same purposes, and which may supplant or substitute for some or all of these manually adjustable controls. At the start of the processes described herein, all of the controllable variables may be manually set or automatically set by the automated system (e.g., the cycle timers (ICDTs), pressure regulators, temperature controller, etc.). Then the operator, user, or distiller, or the automated system would need to monitor the system 100 and make any setting changes needed or desired, as dictated by quality or quantitative control sampling, testing, analysis, and/or observation. In any event, whatever the control method, for the processes described herein, the ability to set, change, and/or monitor all process variables must be provided for.

In preparation for initiating a process cycle of the system 100, as indicated above, unmatured spirit liquid may be placed into the aging container 104. In certain embodiments, the following settings may be made in the system 100:

1. The ICDT 105 on/off duration times each may be set initially to 30 minutes, giving a total on/off cycle of one hour.

2. The pressure control gas source 102 output may be set at 30 PSI and a system pressure regulator valve 124 may be set at 15 PSI.

3. A system safety relief valve 122 may be set at 40 PSI.

4. The process control gas source 101 (e.g., an oxygen cylinder) output pressure may be set by a pressure regulator 126 at 3 PSI, and a process control gas source shutoff valve 127 may be opened.

5. An aging container pressure relief valve 123 may be briefly opened to bleed off air in a headspace 115 of the aging container 104. This air may then be supplanted by process gas from the process control gas source 101.

6. The aging container pressure relief valve 123 may be closed when a desired mixture of process gas in the aging container 104 has been reached. In certain embodiments, 100% process gas may be the recommended level.

Figure 3A:
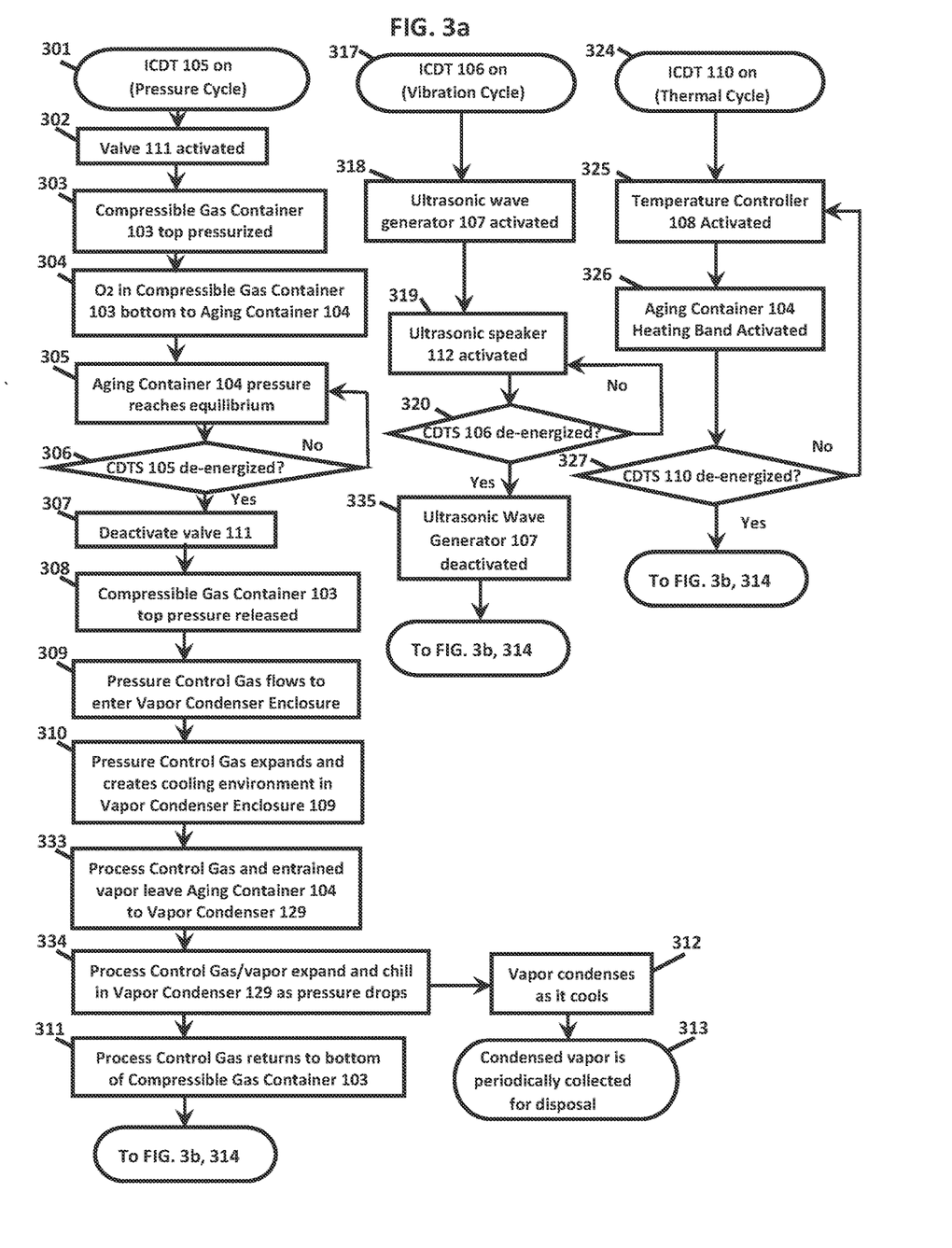
FIGS. 3a and 3b illustrate a flowchart, in accordance with embodiments of the invention.
Figure 3B:
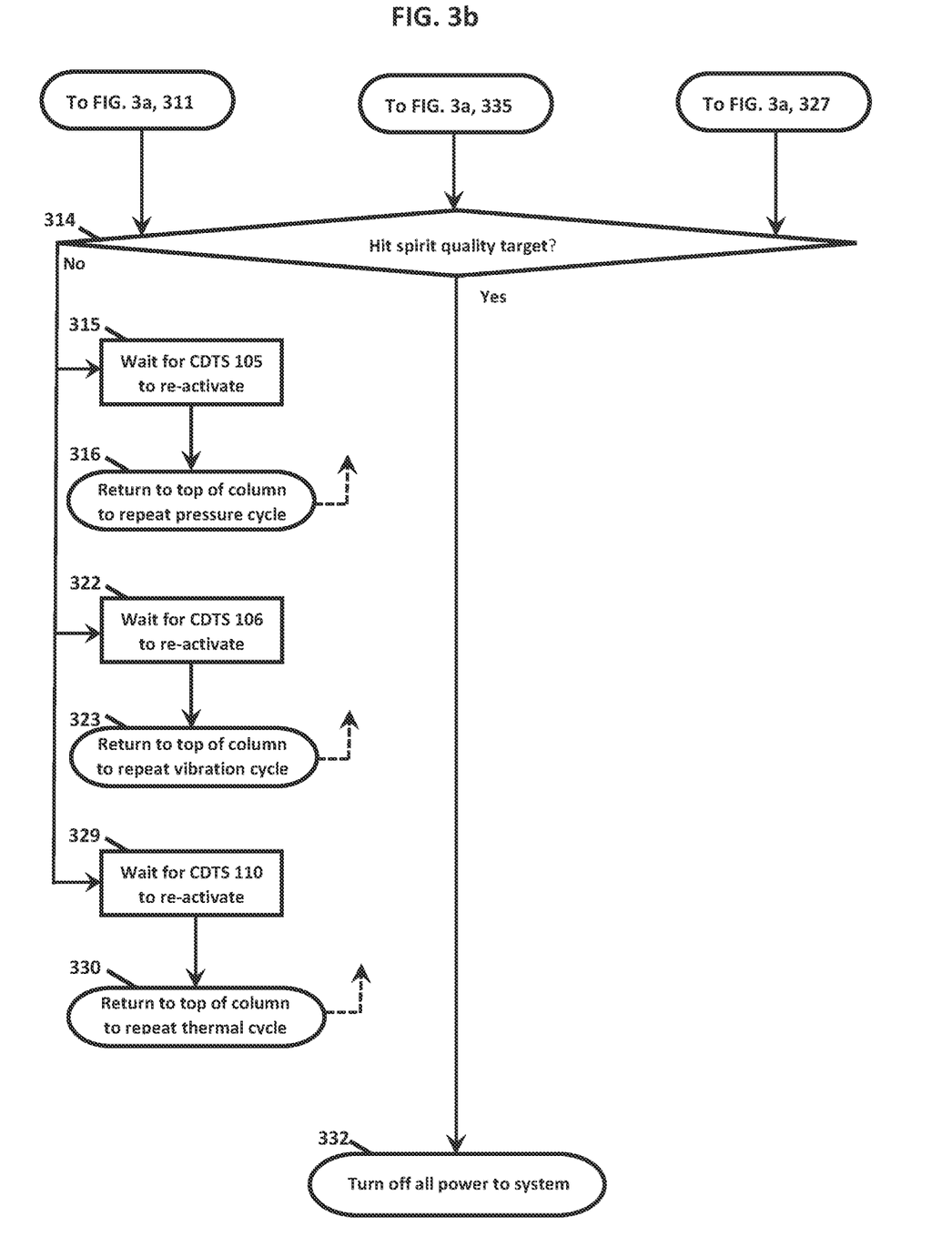

Referring to FIGS. 1, 3a, and 3b, there are three separate cycle flow paths for the processes of the system 100 (e.g., Pressure, Vibration, and Thermal). These processes may all be initiated when the main power switch is turned on and all three separate power switches (not shown), bringing power to each ICDT timer (i.e., ICDTs 105, 106, and 110, described further below), are turned on. In certain embodiments, a typical startup would have all cycle flow paths turned on at the same time. Each cycle flow path would then run simultaneously and independently from the others with its own ICDT that may and usually would operate on different cycle times from the ICDTs of the other cycle flow paths as set by the operator. Each of these independent cycle flow paths may proceed as shown in the flowchart of FIGS. 3a and 3b until a decision point is reached regarding hitting or achieving spirit quality target(s) 314. At this point, by taking a sample, the operator may compare the overall quality of the spirit against the spirit quality target(s) through qualitative measurements (or the operator may use quantitative tests instead or in addition). If the operator (or automated system) is satisfied that the target(s) is achieved, then the operator may turn off the system 100 by turning off the main system power switch (or the automated control may turn off the system 100). In other embodiments and/or for reasons determined by the operator (or the automated system), at any point during the operation of the system 100, the operator (or the automated system) may decide that any individual (or more than one) cycle flow path has reached its peak influence or plateau on product quality. In this case, the operator (or the automated system) may turn off the separate power switch only to that cycle flow path ahead of the timing out of its associated ICDT, terminating the operation of that cycle flow path while still allowing the remaining cycle flow path(s) to continue to operate according to the timing of the latter's(s') ICDT(s). As an example, the thermal cycle may have a major effect on spirit coloration. If the color target has been reached and the operator determines that further operation of the thermal cycle flow path may not improve coloration or even cause deterioration in spirit quality, the operator (or the automated system) may turn off the power switch to the ICDT 110 (while leaving the main system power on), ending the thermal cycle flow path, while allowing the remaining cycle flow path or paths to continue.

As described above, all three cycle flow path switches typically may be turned on at the beginning of the aging process upon turning on the main system power switch. When main power is turned on, all three ICDTs are automatically turned on. It may be possible to initiate and terminate individual cycle flow paths at different times, however, although this may or may not make sense and would likely depend on the circumstances, possibly dictated by trying to hit or achieve a desired target(s). [The operator (or the automated system) nevertheless may decide to do so based on experience or prior results, or for some other reason, and therefore such operation is not precluded. For example, it may be desirable to perform just one or two of the cycle flow paths on a previously distilled spirit. In addition, the operator (or the automated system) may decide to stagger the starting and ending times of the different ICDTs. When all three cycle flow paths are initiated simultaneously or nearly simultaneously at the start of the aging process, then, at any time during the aging process, the operator (or the automated system) may determine that one or more of the cycle flow paths has (have) contributed its (their) maximum benefit and decide to shut down that (those) portion(s) manually (or automatically).

System Cycles:

Pressure Cycle:

With the main power supply turned on, referring to FIGS. 1, 3a, and 3b, the Pressure Cycle flow path that the system 100 may pass through is described as follows. The ICDT 105 may be turned on 301. The 3-way directional valve 111 may be activated 302 to open, sending the pressure control gas (e.g., compressed air) into, and pressurizing 303, a top compartment of the compressible gas container 103 (e.g., a top compartment of the bladder tank). As the top compartment of the compressible gas container 103 becomes pressurized, an internal separator 128 (e.g., a bladder) that separates the top compartment from a bottom compartment of the compressible gas container 103 (e.g., a bottom compartment of the bladder tank) may be pushed down, which may pressurize and fluidly drive 304 the process control gas (e.g., oxygen)—which was already introduced into the bottom compartment when the pressure regulator 126 was set and the process control gas source shutoff valve 127 was opened—into the aging container 104. A check valve 116 may be installed inline to the aging container 104 to direct the flow of the process control gas into a diffuser stone 117 inside and near the bottom of the liquid in the aging container 104 until the pressure in the aging container 104 may reach equilibrium 305. This may cause bubbling up of the process control gas inside the aging container 104 and may saturate the liquid with the process control gas while also providing some mixing of the contents of the aging container 104.

Figure 4:
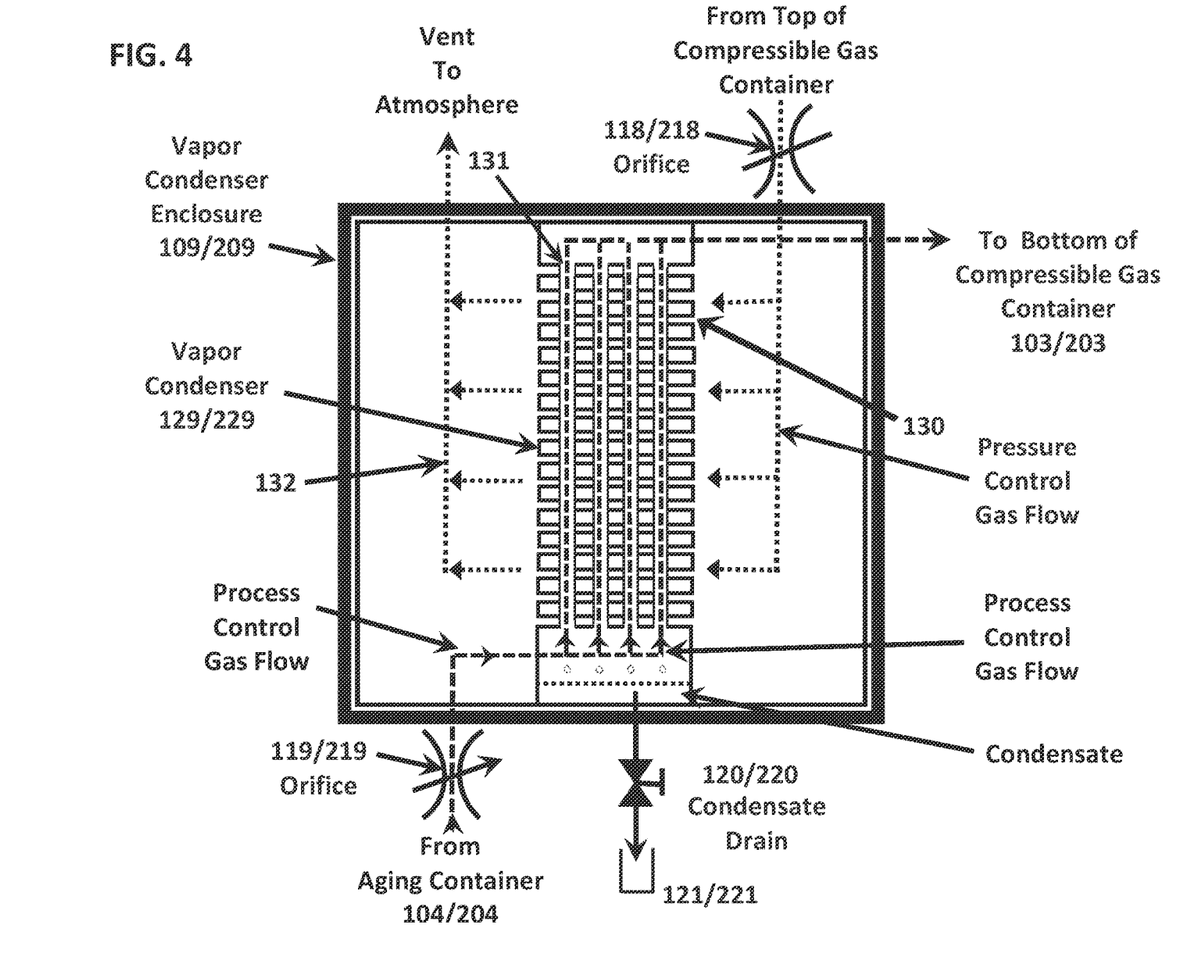
FIG. 4 is a detailed view of a heat exchanger (e.g., a vapor condenser and a vapor condenser enclosure) shown in FIGS. 1 and 2, in accordance with embodiments of the invention.

Until the ICDT 105 de-energizes (because the set time-on duration has not yet been reached), the aging container 104 may remain in equilibrium 305. When the set time-on duration has been reached, the ICDT 105 may de-energize 306 and the directional valve 111 may deactivate 307 and switch to exhaust or release the compressed pressure control gas (e.g., air) 308 from the top of the compressible gas container 103. This exhausting pressure control gas may flow 309 through an adjustable orifice 118 to enter the vapor condenser enclosure 109 that contains the vapor condenser 129 (see FIG. 4). The vapor condenser 129 may be designed to include pressure control gas vanes with openings, channels, pathways, or the like 130 between the vanes (hereinafter, vane openings 130) for the pressure control gas to pass through and corresponding open process control gas channels, pathways, or the like 131 (hereinafter, channels 131) for the process control gas to pass through (described further below), as schematically shown in FIG. 4. The openings 130 provide passageways for the pressure control gas to flow separately from and outside the channels 131 through which the process control gas flows for cooling inside the vapor condenser. A metal barrier(s) between the openings 130 and the channels 131, which may include the vanes and walls forming the channels 131, keeps the two gases from intermixing, but allows this cooling to occur, via heat transfer across the barrier(s), with heat passing from the process control gas to the pressure control gas. This further drops the temperature of the process control gas, causing additional condensing of the entrained vapors in the vapor condenser 129. Together, the vapor condenser enclosure 109 and the vapor condenser 129 form a heat exchanger for this cooling purpose.

The volume of the exhausting pressure control gas may expand and the pressure of this gas may drop as it passes through the orifice 118 into the vapor condenser enclosure 109, creating a cooling environment 310 (described further below). The pressure control gas then passes through the openings 130 between the vanes, as described above, and in turn along a pathway 132 in the vapor condenser enclosure 109 to pass through a vent or exhaust to the atmosphere (see FIG. 4). The vapor condenser enclosure 109 and the vapor condenser 129 are in-line between the compressible gas container 103 and the vent or exhaust to accomplish this.

As described above, the 3-way directional valve 111 releases the pressure control gas (e.g., compressed air) from the top compartment of the compressible gas container 103 (e.g., the bladder tank or the pneumatic cylinder). As the pressure of the compressed pressure control gas drops within the top compartment of the compressible gas container 103, this generates a condition whereby the pressure of the process control gas within the bottom compartment of the compressible gas container 103 becomes greater than the pressure of the pressure control gas in the upper compartment of the compressible gas container 103, causing a corresponding expansion of the bottom compartment, which moves the separator 128 upward, and a corresponding shrinkage of the top compartment. This expansion may create a vacuum that may pull the process control gas (and some entrained spirit vapor) 333 from the top of the aging container 104, through a check valve 114 and an adjustable orifice 119 at or in the wall of the vapor condenser enclosure 109, and into and through the vapor condenser 129 on its way back eventually into the bottom compartment of the compressible gas container 103. In so doing, the process control gas (and some entrained vapor) passes through a pipe or conduit from the wall of the vapor condenser enclosure 109 that attaches directly to the vapor condenser 129 (schematically shown in FIG. 4). The process control gas that passes to and through the channels 131 of the vapor condenser 129 does not intermix with the pressure control gas in the vapor condenser enclosure 109 or as the pressure control gas passes to and through the channels 130, but stays within the confines of the channels 131 before returning to the bottom compartment of the compressible gas container 103. As the process control gas (and some entrained vapor) flows through the adjustable orifice 119 and into the channels 131 of the vapor condenser 129, it expands and its pressure drops, causing a drop in temperature or chilling 334 in the vapor condenser 129. As mentioned above, this process control gas finally then returns 311 to the bottom compartment of the compressible gas container 103, as schematically shown in FIG. 4.

The primary principle behind the operation of the vapor condenser 129 and the vapor condenser enclosure 109 described above is the "ideal gas law" whereby the temperature of a pressurized gas will lower when it passes through a small orifice and expands into a larger, lower pressure space. As discussed above, as the pressure control gas passes through the adjustable orifice 118 and enters the vapor condenser enclosure 109, its volume increases, its pressure lowers, and it cools and flows into the vanes 130 of the vapor condenser 129. Passing through the vanes 130, this pressure control gas also cools the process control gas flowing through the channels 131 by heat transfer or exchange processes involving the metal materials used to construct separate, but intermingling, i.e., crossing, pathways, of the vanes 130 and the channels 131 with respect to each other (to prevent intermixing of the gases), as would be understood by one of ordinary skill in the art. Likewise, the heated process control gas, as it passes through an adjustable orifice (only shown schematically in FIG. 4) to enter into the vapor condenser 129, expands, drops in pressure and cools. This cooling may condense at least a portion of any spirit vapors entrained in the process control gas before this process control gas passes through the channels 131. Also, the cooling effect of the pressure control gas passing through the vanes 130 and the process control gas passing through the channels 131 may condense at least a further portion of the spirit vapors entrained in the process control gas. This process control gas then exits the vapor condenser to return to the bottom of the compressible gas container 103. Referring again to FIG. 3a, this double cooling effect which may help promote liquification or condensation of entrained spirit vapor 312, may result in drops of the condensed vapor falling and collecting as a condensate in the bottom of the vapor condenser 109, as schematically shown in FIG. 4. The vapor condensate may be periodically collected or drained off for testing or disposal 313 as waste via a valve or drain 120 from a condensate container 121.

The operations and features described above for condensing and collecting the entrained vapor generated in the headspace at the top of the aging container may be useful for the removal of unwanted chemical components or contaminants that may be produced during the distillation and/or fermentation phases for making alcoholic beverages, in accordance with embodiments of the invention. Exemplary undesirable materials or byproducts that may be removed as the condensate include such chemicals as acetone and methanol. During distillation and fermentation, ethanol is the highest volume and most desired component or product obtained. However, the liquid or beverage in the aging container 104, in addition to ethanol, may also include these other components trapped within the aging container in liquid or vapor form. Because many of these undesirable components are less dense than ethanol, they may rise to the surface of the liquid in the aging container 104. They also may have a higher vapor pressure than ethanol and therefore are more likely to vaporize and be in gaseous form within the headspace above the maturing liquid. The purpose of the heat exchanger (e.g., the vapor condenser 129 and the enclosure 109) is to remove these unwanted vapors by condensing them back into liquid form and periodically draining them for testing or disposing them as waste.

Because many or some of the undesirable components or contaminants in the unmatured spirit may be the most volatile, these components may be the first to vaporize within the aging container 104 and become entrained, as described above, and thus may comprise the first condensates (or some of them) to appear at the bottom of the vapor condenser 109. The vapor condenser 109 therefore may serve advantageously to strip these undesirable components from the aging spirit.

Referring again to FIGS. 1 and 3b the spirit liquid may be sampled and/or tested for achieving a spirit quality or desired target(s) 314 by periodically removing some from the aging container 104 for analysis. This is done by slowly opening a sampling port needle valve 125 while the aging container 104 is in the pressurized phase of its cycle. If the target(s) is not hit or achieved, whether qualitative in nature, such as color, aroma, taste, etc. or quantitative in nature, such as alcohol content, once the ICDT 105 may be re-activated or re-energized 315, the Pressure Cycle described above may be repeated 316 by returning to the top of the column with the ICDT 105 turned on 301. Any loss of oxygen gas during this or any other System Cycle (i.e, this or any other Process, Vibration, or Thermal Cycle) may be made up from the process control gas source 101 to help assure a constant minimum pressure of 3 PSI is maintained within the aging container 104 during the non-pressurized portion of the Pressure Cycle. This may be accomplished using the pressure regulator 126.

If all spirit quality or desired target(s) have been achieved 314 during the Process Cycle, which may have been repeated a number of times, then all power may be manually or automatically turned off 332 to the system 100, effectively turning off power to all three ICDTs and shutting down the system 100. Or if the influence of just this, or repeated or other Pressure Cycles on the quality or characteristics desired against the target(s) has reached its maximum or plateaued, but one or both of the other cycle flow paths have not maximized its or their influence on the quality or characteristics, then the Pressure Cycle may alone be terminated by turning off power only to ICDT 105 while allowing the one or both other cycle flow paths to continue.

Vibration Cycle:

Referring again to FIGS. 1, 3a, and 3b, a Vibration Cycle that the system 100 may pass through is described as follows. In certain embodiments, on/off timers (not shown) within the ICDT 106 may be set initially to 30 minutes each. These timers do not necessarily need to, but they may coordinate with the other pressure cycle timers described above. With system power on, power to the ICDT 106 first may be turned on 317, which may activate or energize 318 an ultrasonic wave generator 107, and which in turn may activate or drive 319 an ultrasonic speaker 112 attached or interfaced to the aging container 104. Vibrations, typically in the range of 20-60 kHz (although other frequencies may be used), may thereby be generated within the container 104, which may reach the cellular level at the spirit/flavorant (e.g., wood chips/cubes) interface or reactive sites and help to promote the chemical conversion and oxidation of the components within the flavorants. This transition or change may be useful for creating a desired color, aroma, and/or taste of the aging and maturing spirit in the aging tank 104. The vibrations may continue until the ICDT 106 de-energizes 320 because its set time-on duration expires and the wave generator 107 may deactivate or de-energize 335. At this point, the spirit in the aging container 104 may be sampled and/or tested for hitting or achieving spirit characteristic(s), quality(ies), or desired quality or quantitative target(s) by removing some from the aging container 104, as described above. If the target(s) is not hit or achieved, or following the completion of the adjustable time-off period or the set time off duration, the timer of the ICDT 106 may (or may be set to) reactivate or re-energize 322 and repeat or begin a new Vibration Cycle 323 by returning to the top of the column with ICDT 106 turned on 317, as described above.

If all spirit quality or desired target(s) have been achieved 314 during the Vibration Cycle, which may have been repeated a number of times, then all power may be manually or automatically turned off 332 to the system 100, effectively turning off power to all three ICDTs and shutting down the system 100. Or if the influence of just this, or repeated or other Vibration Cycles on the quality or characteristics desired against the target(s) has reached its maximum or plateaued, but one or both of the other cycle flow paths have not maximized its or their influence on the quality or characteristics, then the Vibration Cycle alone may be terminated by manually or automatically turning off power only to ICDT 106 while allowing the one or both other cycle flow paths to continue.

Thermal Cycle:

Referring further to FIGS. 1, 3a and 3b, a Thermal Cycle that the system 100 may pass through is described as follows. In certain embodiments, a temperature controller 108 may be set to, for example, 115° F. (although other temperatures are contemplated). The temperature controller 108 may be part of a feedback-controlled system that continually monitors the temperature within the aging container 104 and adjusts the power sent to a heating unit 113 (e.g., a band, source, or element) around, interfaced with or to, or for providing heat to, the aging container 104 to maintain the set temperature. In other embodiments, the heating unit 113 may be located within the aging spirit in the aging container 104. In some of these embodiments, on/off timers (not shown) within the ICDT 110 for the temperature controller 108 may be set initially, for example, to 2 hours on and 2 hours off (these times are adjustable and other possible time durations are contemplated, longer or shorter, by setting these timers, which is the same for the other timers described herein). Power may be supplied to turn on 324 the ICDT 110. This may begin the 2-hour on period, in which the temperature controller 108 may be activated or energized 325, and power may be supplied to activate or energize 326 the heating unit 113. The heating unit 113 may be wrapped completely or partially around, touching or be in close proximity to, and thermally coupled to, the aging container 104. As the aging container 104 heats up to a set temperature due to the heating unit 113 (e.g., the 115° F. setting), the temperature controller 108 may monitor the external temperature of the aging container or, if an internal heating unit 113 is used, the temperature of the internal aging liquid. Once the set temperature is reached, it may be maintained until the set on time expires, the ICDT 110 may be de-energized 327, and the temperature controller 108 may be deactivated or de-energized. Until the set time expires, the ICDT 110 and the temperature controller 108 remain active as indicated in FIGS. 3a and 3b. Once the set on time expires, the adjustable set off time (e.g., 2 hours) will begin, and a sample may be taken, as described above, to see if a desired quality target(s) has been hit or achieved 314 (see FIG. 3b). Or, following the completion of the set off time, if a desired quality target(s) has not been hit or achieved, or if a sample is not taken, the system 100 may wait for the ICDT 110 to reactivate or re-energize 329 via the timers of the ICDT 110 and a repeated or new Thermal Cycle may begin 330 by returning to the top of the column, as described above.

If all spirit quality or desired target(s) have been achieved 314 during the Thermal Cycle, which may have been repeated a number of times, then all power may be manually or automatically turned off 332 to the system 100, effectively turning off power to all three ICDT's and shutting down the system 100. Or if the influence of just this, or repeated or other Thermal Cycles on the quality or characteristics desired against the target(s) has reached its maximum or plateaued, but one or both of the other cycle flow paths have not maximized its or their influence on the quality or characteristics, then the Thermal Cycle alone may be terminated by manually or automatically turning off power only to ICDT 110 while allowing the one or both other cycle flow paths to continue.

End of Process:

As described above, samples may be withdrawn. Referring to FIG. 1 again, daily or weekly (or other shorter or longer time periods) samples may be taken from the system 100 during a pressure "on" period by slowly opening the sample port or needle valve 125 above the aging container 104. Changes to the flavor, aroma, and color may be monitored and recorded, for example, by the operator, user, or distiller, qualitatively (e.g., visually, tasting, smelling, etc.) and/or quantitatively (e.g., using instrument(s) or testing equipment analysis(es)), or they may be monitored automatically. If these quality characteristics deviate from desired characteristics or are headed in the wrong direction (e.g., are becoming undesirable, off target(s), or heading there), adjustments may be made immediately to the quality and control factors (e.g., time, temperature, pressure and/or vibrations (for the associated System Cycles), or in the quantity and mixture of the added flavorants, the % of oxygen, etc.) to bring these quality or quantitative characteristics back in line with the desired target(s). It should be noted that all three System Cycles may be run simultaneously or essentially simultaneously, but independently (i.e., controlled by different ICDTs), or they may be stopped by the operator or automatically to make adjustments, such as to change the set time(s) of any of the ICDTs to stop, repeat, continue, or change any or all of the System Cycles, as described above. Any or all of the System Cycles may be changed or terminated manually (or automatically) at any time if further running of one or more of the System Cycles will not produce any additional positive changes in the spirit product or that the effect of the one or more Cycles have maxed out or plateaued. In the event that the operator wants to shut down the system 100, or determines that they have achieved a desired spirit quality target(s) or characteristics, or determined that no further benefits may be gained to spirit quality or characteristics (or if this is done automatically), power may be shut off 332 manually (or automatically) to the ICDTs 105, 106, and 110 and to the main system power switch. All pressure may then be released from the system 100 by first closing the valve 127 at the process control gas source 101 and the valve 134 at the pressure control gas source 102, then slowly opening the pressure relief valves 122 and 123 to release all internal gas pressures. After the pressure has been released and the spirit temperature may drop to ambient level, the system 100 then may be safely opened for inspection, adjustment, and/or removal of the aged spirit to prepare for further testing or final bottling.

Feedback Control

For the system 100 (or 200), in certain embodiments, feedback control, as described herein, may take several forms:

For temperature control in the aging container 104, for certain embodiments of the system 100 that include the heating unit 113 as a heating band on the aging container 104, as described above, feedback control may be provided at the heating band. For example, a proportional control system ("controller") may be included as a component within the control panel or unit 133 and a voltage may be provided that is applied to the heating band with a real-time measurement of the actual temperature inside the aging container 104 fed back to the controller and monitored. As the actual temperature approaches the set temperature, the voltage to the heating band may gradually decrease until the set temperature is reached. This control may be accomplished in any number of ways (e.g., using voltage, amperage, on-off times, proportional, non-proportional, etc.), as would be understood by one of ordinary skill in the art. Reliable temperature control is important to make sure thermal "runaway" does not occur that may cause a dangerous situation to arise.

For pressure control of the pressure control gas and the process control gas, for certain embodiments of the system 100, feedback control may be provided by including a pressure regulator as a component within the control panel or unit 133. The pressure regulator may allow the gases to be introduced into the system 100 and the downstream pressure may rise until a set point is reached. The pressure regulation, in effect, monitors this downstream pressure such that more gas passes through it if the pressure drops below the set point and excess gas vents if the downstream pressure rises above the set point. Pressure regulators may be included that allow this function to be controlled remotely, electronically and digitally, such as via the automated system described herein. The amount of feedback control may depend on the design of the system 100, and/or on the amount of automation needed or desired.

For vibration control of the ultrasonic vibration, for certain embodiments of the system 100, feedback control to maintain the set ultrasonic frequency may be provided by the manufacturer of a commercially available ultrasonic wave generator that may be installed as the ultrasonic wave generator 107 included within the control panel or unit 133. The ultrasonic frequency may also be monitored by the operator, user, distiller, or the automated system. However, whether commercially available or custom designed for the system 100, a variable frequency ultrasonic wave generator may be used as the ultrasonic wave generator 107 to vary or modulate the ultrasonic frequency and vibration feedback control may be provided to keep or change the set ultrasonic frequency or its modulation. It may turn out that an optimal ultrasonic frequency, frequency range or band, or certain modulation is discovered, which may depend on the type of spirit being aged, on the type of flavorants added, or on the preferences of the operator, user, distiller, or automated system, and which may be based on testing of samples. In that case, for certain embodiments of the system 100, a custom ultrasonic frequency generator may be designed and constructed for use as the ultrasonic frequency generator 107 to operate accordingly.

It should be understood that the pressure/temperature/vibration on-off power switches may be manually operated, controlled remotely by an operator, user, or distiller, or by the automated system, which may be a smart control system.

The type of control described herein may depend on the degree of sophistication desired, the cost constraints, and the desire for a human or machine interface to be making all or some of the decisions involved in maturing or aging a spirit. Because making a fine spirit is a unique combination of art and science, the need for human sensory evaluation most likely will still be needed to make judgements about how the product quality compares against the target. It may be years before making fine spirits will be totally automated with logic and sensors developed to mirror those currently provided by expert distillers. However, this may occur in piecemeal fashion over time, and gradually automation of the aging process may predominate as reliable tools are developed.

Additional Embodiments and Applications within the Scope of the Invention

It is contemplated that the processes described herein may be applicable to (but not limited to) distilled spirits, such as whiskey, vodka, scotch, bourbon, or the like by using oxygen as the gas introduced to the top of the aging container 104, as described herein. It is also contemplated that the processes described herein may be applicable to aging a fermented liquid to become aged wine instead of for aging a fermented liquid to become an aged distilled spirit. This may be accomplished by replacing the process control gas (e.g., $O_2$) with an inert gas, such as, but not limited to, nitrogen ($N_2$) or carbon dioxide ($CO_2$), to prevent or limit oxidation. The use of other inert gases may be possible.

It is also contemplated that the flavorants may include various types of wood or wood chips/cubes, such as, but not limited to, American white oak, French oak, Eastern European oak, or the like, or a combination thereof. For wine, conventional aging occurs in a barrel. The barrel acts a flavorant because the chemical compounds within the body of the wood flavors the wine. Some wine manufacturers also introduce spices, herbs, fruits, and/or flowers, or other materials into the aging barrels to impart different flavor, aroma or color characteristics into the wine being produced. Such additives may be used in the inventive processes (or System Cycles) describe herein. Likewise, for distilled spirits made using the inventive processes (or System Cycles) described herein, it is also contemplated that the flavorants may include, but are not limited to, various types of spices, herbs, fruits, and/or flowers, or a combination thereof.

As described herein, the vapor condenser 129 and the enclosure 109 may be used to help separate the entrained vapor from the process control gas within the headspace of the aging container 104. It is also contemplated that any other heat transfer system, apparatus, processes, or methods may instead be used, as would be understood by one of ordinary skill in the art, to accomplish the same or similar result.

Further, as described herein, the adjustable orifices 118 and 119 used at both the pressure control gas and process control gas entry points, respectively, to the heat exchanger (e.g., the vapor condenser 129 and the enclosure 109, respectively) may be constructed of stainless steel, or any other material chemically compatible with alcohol. These orifices 118 and 119 may provide for a sudden increase in vapor volume and drop in pressure within the heat exchanger. This volume increase and pressure drop in turn may cause a drop in the internal temperature within the heat exchanger and promote condensation of the entrained vapor, as described above. It is also contemplated that any other system, apparatus, processes, or methods may instead be used, as would be understood by one of ordinary skill in the art, to accomplish the same or similar results.

Some alcoholic beverages are historically aged in used wooden barrels to enhance or impart different flavors in the maturing beverage (e.g. scotch by custom must be aged in used whiskey barrels). Likewise, some spirits and wines are given a second or later aging period (after the initial aging process has completed) in different types of used whiskey or wine barrels with the intent of imparting a broader spectrum of flavors into the product. It is further contemplated that this also may easily be done with the system 100 (or 200) by simply using flavorants recovered from previous runs in the aging container at the start of a process run (e.g., for scotch with used wood chips/cubes). One could also replace the flavorants in the aging container at the end of a System Cycle(s), as described herein, with used flavorants recovered from a different process or source to attain a "blended" flavor product. This opens up a variety of different flavor characteristics possibilities available at much reduced cost and aging time.

The specific embodiments disclosed herein are merely exemplary, and it should be understood that within the scope of the appended claims, the invention may be practiced in a manner or manners other than those specifically described in these embodiments. Specifically, it should be understood that the claims are not intended to be limited to the particular embodiments or forms disclosed, but rather to cover all modifications, equivalents, and alternatives falling within the spirit and scope of this disclosure. Also, any structures, components, apparatus, process, or method parameters, or sequences of steps disclosed and/or illustrated herein are given by way of example only and may be varied as desired. For example, for any steps illustrated and/or described herein that are shown or discussed in a particular order, these steps do not necessarily need to be performed in the order illustrated or discussed. Further, the various exemplary structures, components, apparatus, processes, or methods described and/or illustrated herein may also omit one or more certain structures, components, apparatus, processes, methods, or steps described or illustrated herein or include additional structures, components, apparatus, methods, or steps in addition to those disclosed.

The invention claimed is:

1. A system for producing an alcoholic beverage and shortening an aging process thereof, comprising:
    system components comprising:
        an aging container configured to include a liquid and flavorant material,
        a heating unit configured to thermally couple to the aging container,
        a process control gas source configured to fluidly couple to the aging container,
        a compressible gas container having a moveable barrier, the compressible gas container configured to fluidly couple to the process control gas source,
        a vapor condenser configured to fluidly couple to the aging container,
        a vapor condenser enclosure configured to fluidly couple to the compressible gas container,
        a pressure control gas source configured to fluidly couple to the compressible gas container and the vapor condenser enclosure, and
        wherein the vapor condenser is configured to fluidly couple between the aging container and the compressible gas container on a process control gas side of the compressible gas container, and wherein the vapor condenser enclosure is configured to fluidly couple between a pressure control gas side of the compressible gas container and an exhaust to the atmosphere.

2. The system of claim 1, wherein the system components are configured to provide a concentrated process gas within the aging container and to enhance oxidation and reduce oxidation time of compounds within the liquid and the flavorant material.

3. The system of claim 2, wherein the oxidation comprises oxidation of complex chemical compounds within the liquid and the flavorant material for achieving a desired flavor, aroma, and/or color profile of the alcoholic beverage.

4. The system of claim 1, wherein the compressible gas container comprises a bladder tank.

5. The system of claim 1, wherein the compressible gas container comprises a pneumatic cylinder.

6. The system of claim 1, wherein the moveable barrier comprises a separation barrier.

7. The system of claim 1, wherein the process control gas source is configured to provide oxygen.

8. The system of claim 1, wherein the process control gas source is configured to provide a regulated, pressurized process control gas.

9. The system of claim 1, wherein the process control gas source is configured to provide nitrogen.

10. The system of claim 1, wherein the process control gas source is configured to provide an inert gas.

11. The system of claim 1, wherein the aging container is configured to contain wood, herbs, fruit, activated charcoal, and/or spices as the flavorant material.

12. The system of claim 1, wherein the liquid is processed into a distilled spirit or wine.

13. The system of claim 1, further comprising a process control unit, including delay timers, pressure regulators, pressure relief valves, gas directional valves, gas pressure gauges, and function control switches, configured to control the system components.

14. The system of claim 13, wherein the process control unit comprises a process computer, smart device, smart phone, tablet, processor, and/or PLC controller(s).

15. The system of claim 1:
wherein the compressible gas container comprises two compartments separated by the moveable barrier, one of the compartments is configured to contain pressure control gas provided by the pressure control gas source and the other compartment is configured to contain process control gas provided by the process control gas source; and
wherein the pressure control gas is configured to impart force via the moveable barrier on the process control gas.

16. The system of claim 15, wherein the pressure control gas is configured to drive the process control gas from the compressible gas container into the aging container.

17. The system of claim 15, wherein the pressure control gas comprises air.

18. The system of claim 1, wherein temperature and/or pressure within the aging container are controlled to be in a periodic cycle or an aperiodic cycle, or a combination of both.

19. The system of claim 1, wherein temperature and/or pressure within the aging container are configured to be controlled in a sinusoidal, stepped, or other varied manner.

20. The system of claim 19, wherein the sinusoidal, stepped, or other varied manner may be maintained or altered for aging the liquid to meet or be similar to a characteristic flavor, aroma, and/or color profile of a conventional barrel-aged product.

21. The system of claim 1, wherein the system components are configured to age the liquid to have particular alcohol content, color, and/or aroma characteristics, and wherein, in the aging container, temperature is controlled by activation of the heating unit, pressure is controlled by activation of the compressible gas container, and ultrasonic waves are controlled by activation of an ultrasonic wave generator.

22. The system of claim 1, wherein the pressure control gas source is fluidly coupled to a pressure control gas side of the compressible gas container, and wherein the aging container and the process control gas source are fluidly coupled in parallel to a process control gas side of the compressible gas container.

23. The system of claim 1, wherein the vapor condenser is configured to cool a process control gas for condensing entrained vapor in the process control gas.

24. The system of claim 1, wherein the system components are configured to control temperature and pressure fluctuations within the aging container for propagating chemical changes in the liquid in a reduced timeframe compared to conventional barrel aging.

25. The system of claim 1, wherein the heating unit comprises a heating band, source, or element around, interfaced with or to, or for providing heat to, the aging container.

26. A system for producing an alcoholic beverage and shortening an aging process thereof, comprising:
system components comprising:
an aging container configured to include a liquid and flavorant material,
a heating unit configured to thermally couple to the aging container,
a process control gas source configured to fluidly couple to the aging container,
a compressible gas container having a moveable barrier, the compressible gas container configured to fluidly couple to the process control gas source,
a vapor condenser configured to fluidly couple to the aging container,
a vapor condenser enclosure configured to fluidly couple to the compressible gas container,
a pressure control gas source configured to fluidly couple to the compressible gas container and the vapor condenser enclosure, and
wherein the vapor condenser enclosure is configured to cool a pressure control gas for helping to facilitate condensing entrained vapor in a process control gas.

27. The system of claim 26, wherein the heating unit comprises a heating band, source, or element around, interfaced with or to, or for providing heat to, the aging container.

28. A method of assembling a system for producing an alcoholic beverage and shortening an aging process thereof, comprising:
adding a liquid and a flavorant material to an aging container;
thermally coupling a heating unit to the aging container;
maintaining a physical separation between a pressure control gas and a process control gas in a compressible gas container using an internal, movable barrier within the compressible gas container;
fluidly coupling a vapor condenser between the aging container and the compressible gas container;
fluidly coupling a vapor condenser enclosure between the compressible gas container and a vent to atmosphere; and
fluidly coupling a pressure control gas source and a process control gas source to the compressible gas container for adding a concentrated process gas within the aging container to enhance oxidation within the flavorant material and reduce aging time of the liquid.

29. The method of claim 28, wherein the system components are configured to control variables that enhance the oxidation and reduction in aging time.

30. The method of claim 28, further comprising providing heat to the aging container from the heating unit comprising a heating band, source, or element.

31. A system for producing an alcoholic beverage and shortening an aging process thereof, comprising:
an aging container configured to contain a liquid and flavorant material;
a compressible gas container configured to contain a separator for separating a pressure control gas from a process control gas within the compressible gas container;
a heat exchanger configured to include a vapor condenser enclosure and a vapor condenser;
wherein the heat exchanger is configured to fluidly couple to the aging container and the compressible gas container; and
wherein the compressible gas container is configured to drive the process control gas from the compressible gas container into the aging container and to pull the process control gas from the aging container into the heat exchanger and back to the compressible gas container during a pressure cycle.

32. The system of claim 31, wherein the compressible gas container comprises a bladder tank.

33. The system of claim 31, wherein the compressible gas container comprises a pneumatic cylinder.

34. The system of claim 31, further comprising a heating unit configured to heat the aging container during a thermal cycle.

35. The system of claim 34, wherein the heating unit comprises a heating band, source, or element around, interfaced with or to, or for providing heat to, the aging container.

36. The system of claim 31, further comprising an ultrasonic wave generator configured to generate ultrasonic waves in the aging container during a vibration cycle.

37. The system of claim 31, wherein the heat exchanger is configured to condense entrained vapor from the process control gas in the heat exchanger for removal.

38. The system of claim 31, wherein loss per unit time of the liquid is reduced compared to the Angel's Share loss with conventional barrel aging.

* * * * *